US006658032B2

(12) United States Patent
Wiemeyer

(10) Patent No.: US 6,658,032 B2
(45) Date of Patent: Dec. 2, 2003

(54) AUTOMATED LASER WAVELENGTH SELECTION SYSTEM AND METHOD

(75) Inventor: Brian D. Wiemeyer, Los Angeles, CA (US)

(73) Assignee: Pranalytica, Inc., Santa Monica, CA (US)

( * ) Notice: Subject to any disclaimer, the term of this patent is extended or adjusted under 35 U.S.C. 154(b) by 0 days.

(21) Appl. No.: 09/972,735

(22) Filed: Oct. 5, 2001

(65) Prior Publication Data

US 2003/0067946 A1 Apr. 10, 2003

(51) Int. Cl.[7] .................................................. H01S 3/00
(52) U.S. Cl. ..................................... 372/38.01; 372/38.1
(58) Field of Search ............................. 372/20, 25, 28, 372/29.02, 55, 32, 57, 38.1

(56) References Cited

U.S. PATENT DOCUMENTS

| | | | |
|---|---|---|---|
| 3,443,243 A | 5/1969 | Patel | 331/94.5 |
| 3,624,551 A | 11/1971 | Gudmundsen et al. | 331/94.5 |
| 3,646,470 A | 2/1972 | Tseng | 331/94.5 |
| 3,665,338 A | 5/1972 | Harris et al. | 331/94.5 |
| 3,739,295 A | 6/1973 | Shah | 331/94.5 |
| 3,872,407 A | 3/1975 | Hughes | 332/7.51 |
| 4,815,820 A | 3/1989 | McNeil et al. | 350/162.17 |
| 4,847,854 A | 7/1989 | Van Dijk | 372/92 |
| 4,867,532 A | 9/1989 | Stanley | 350/162.23 |
| 4,942,583 A | 7/1990 | Nazarathy et al. | 372/20 |
| 5,297,155 A | 3/1994 | Pan et al. | 372/20 |
| 5,331,651 A | 7/1994 | Becker et al. | 372/32 |
| 6,055,348 A | 4/2000 | Jin et al. | 385/37 |
| 6,141,360 A | 10/2000 | Kinugawa et al. | 372/20 |
| 6,269,110 B1 * | 7/2001 | Leinhos et al. | 372/57 |
| 6,327,284 B1 * | 12/2001 | Stamm et al. | 372/32 |
| 6,381,256 B1 * | 4/2002 | Stamm et al. | 372/19 |
| 6,393,037 B1 * | 5/2002 | Basting et al. | 372/20 |
| 6,404,795 B1 * | 6/2002 | Leinhos et al. | 372/57 |
| 6,463,086 B1 * | 10/2002 | Stamm et al. | 372/20 |
| 2001/0005387 A1 | 6/2001 | Yamada et al. | 372/20 |

OTHER PUBLICATIONS http://www.jandel.com/Peakfit/index.cfm, undated and Author unknown.
http://Nasatech.com/Briefs/Feb98/0298MOCO2.html, "Precision Laser Grating", R. Seubert et al., Feb. 1998.

* cited by examiner

*Primary Examiner*—Paul Ip
*Assistant Examiner*—Phillip Nguyen
(74) *Attorney, Agent, or Firm*—Jones Day

(57) ABSTRACT

An automated laser wavelength selection system and method. The system comprises a laser including a lasing medium having an output spectrum characterized by a plurality of discrete spectral lines, an adjustable wavelength selector disposed within and optically coupled to an optical cavity of the laser, a detector optically coupled to the laser to measure the power of light output from the laser, and a processor electronically coupled to the detector and to the wavelength selector. The processor adjusts the wavelength selector through a series of discrete steps and receives a power measurement from the detector at each of the steps. The processor performs statistical analyses on the power measurements, and, based on the statistical analyses, the wavelength selector is adjusted to selectively pass a wavelength that approximately corresponds to a peak of a desired spectral line.

16 Claims, 5 Drawing Sheets

AUTOMATED LASER WAVELENGTH SELECTION SYSTEM AND METHOD

BACKGROUND OF THE INVENTION

1. Field of the Invention

The field of the present invention is lasers, and in particular lasers having output defined by a number of fixed frequency laser lines.

2. Background

The lasing medium of a variety of lasers produce an output characterized by a plurality of fixed frequency laser lines (also referred to herein as spectral lines). Such lasers include $CO_2$ lasers, CO lasers, all of the molecular lasers operating on a number of vibrational-rotational transitions, and argon ion and other lasers that are capable of producing a number fixed frequency laser lines at discrete wavelengths. Generally, for any of these lasers, light output from only one of the laser lines is utilized at a time. If the laser is operating on more than one of the wavelengths at any given time, all of the other laser lines are filtered out with a wavelength selector, such as a grating spectrometer, band pass filter, or any other type of wavelength selector known to those skilled in the art. The unused laser wavelengths and their corresponding optical power output are discarded. This often results in wasted power and reduces the overall operating efficiency of the laser system. It is, therefore, desirable to have the laser amplify only one desired wavelength at any given time. For the molecular lasers such as the $CO_2$ lasers, amplification of only one line results in all the power output from the laser occurring on the corresponding transition and results in increased efficiency of the laser for producing laser output at the desired wavelength. Thus it is desirable to have the wavelength selector inside the laser cavity rather than outside the cavity where the wavelength selector must select a given wavelength from the output of a laser operating on multiple transitions simultaneously. The internal wavelength selector is usually adjustable to allow light from any one of the laser lines to be selected for resonance in the cavity. If the absolute tuning position of the wavelength selector, for example the angle of the grating with respect to the lasing axis, as it relates to the actual wavelength selected, can be specified then the output of the system may be tuned directly to the desired wavelength by simply adjusting the wavelength selector. However, if the absolute position of the wavelength selector cannot be specified or the mechanical or thermal stability of the system cannot be assured for long periods of time, then additional equipment, and in some instances additional information, is needed to selectively tune the system to the desired wavelength.

One solution is to employ an external or internal spectrometer in combination with the wavelength selector. With this addition, the absolute position of the wavelength selector does not need to be known as the spectrometer may be used to track the wavelength of the light generated by the laser. However, even with this system substantial mechanical and thermal stability is required.

A second solution is to monitor the laser power output as a function of the tuning of the internal wavelength selector. While this solution does not require knowing the wavelength at or near the peak of the desired laser line, it does require knowing the absolute power output of the laser at the peak of each of the laser lines so that a specific laser line can be selected by knowing the absolute maximum power produced by the laser as a function of the tuning of the wavelength selector. This requirement gives rise to difficulties in using such a system with different lasers because absolute power at a particular laser line can vary significantly, even for similar types of lasers. Moreover, as a laser ages, even for a well-characterized laser, the absolute power output on a given transition cannot be guaranteed over the lifetime of the laser. Moreover, some of the laser lines may accidentally produce the same amount of output power.

Thus, an improved system and method for selecting an output wavelength from a laser is desired. Such an improved system and method should work with a wide variety of lasers having (1) a lasing medium that has an output characterized by a number of fixed frequency laser lines, and (2) an adjustable wavelength selector. The system and method should also require no prior knowledge of the laser's absolute power profile and require no monitoring of the laser's output wavelength to verify that the output wavelength is contained within the selected laser line.

SUMMARY OF THE INVENTION

The present invention is directed to a system and method for selecting an output wavelength of a laser, wherein the laser includes a lasing medium having an output spectrum characterized by a plurality of discrete spectral lines. The wavelength selection process ensures that the selected wavelength approximately corresponds to a peak of the desired spectral line. The system for selecting the laser wavelength comprises a laser having the qualities just described, an adjustable wavelength selector disposed within and optically coupled to the optical cavity of the laser, a detector optically coupled to the laser for monitoring the power of light output from the laser, and a processor electronically coupled to the wavelength selector and the detector.

The wavelength of light selectively passed by the adjustable wavelength selector resonates within the optical cavity and provides the necessary feedback for generating the output of the laser. Thus, light output from the laser is primarily comprised of the chosen wavelength. The power of the light output is measured by the detector and the power measurements are transmitted to the processor. The processor adjusts the wavelength selector through a series of discrete steps, receiving at least one power measurement at each of the steps. Statistical analyses are performed on the power measurements, and based on the statistical analyses, the processor adjusts the wavelength selector to selectively pass light having a wavelength that approximately corresponds to a peak of one of the spectral lines. The statistical analyses performed preferably include standard deviation analyses and curve fit analyses.

Preferably, the laser included in the laser systems according to the present invention include a lasing medium having an output spectrum characterized by a plurality of discrete spectral lines and a distinct flat region where no spectral lines produce laser gain. The above process may be broken down into three distinct phases. In the first phase, the flat region is identified by adjusting the wavelength selector through a first series of discrete steps, taking power measurements of the laser light generated as the wavelength selector is adjusted, and identifying the flat region of zero power output through statistical analyses of the power measurements. Once the flat region has been located, the second phase of the operation is performed to identify the desired spectral line. This is done by adjusting the wavelength selector through a second series of discrete steps, taking laser power measurements, and identifying the desired spectral line through statistical analyses of the power measurements. The last phase comprises adjusting the wavelength selector in discrete steps through the identified spectral line to selectively pass a wavelength approximately corresponding to the peak of the desired spectral line.

Accordingly, it is an object of the present invention to provide an improved system and method for selecting an output wavelength from a laser. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
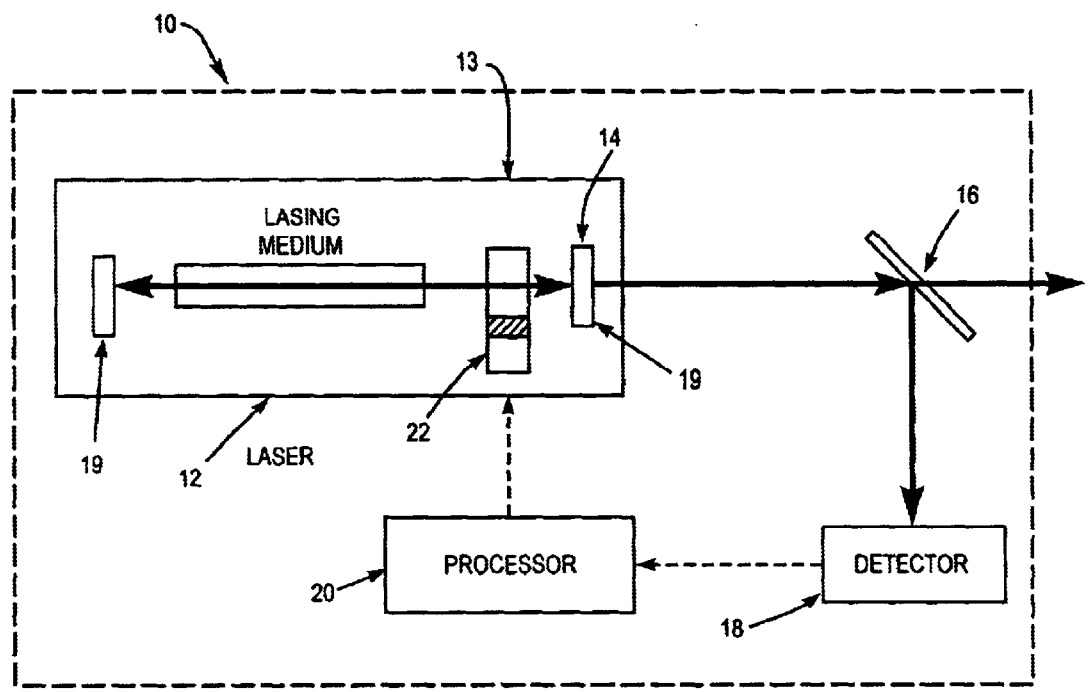
FIG. 1 illustrates a laser wavelength selection system in accordance with a preferred embodiment of the present invention.

Turning in detail to the drawings, FIG. 1 illustrates a laser wavelength selection system 10 according to a preferred embodiment of the present invention. The system 10 comprises a laser 12, a beam splitter 16, a detector 18, and a processor 20. The laser 12 includes a lasing or gain medium 13 disposed between the two end reflectors 19, which form the optical resonant cavity of the laser. An adjustable wavelength selector 14 is disposed within and optically coupled to the lasing medium 13.

In absence of the wavelength selector 14, the laser 12 would have an output spectrum characterized by a plurality of discrete spectral lines. Examples of such lasers include $CO_2$ lasers, CO lasers, argon ion lasers, and other lasers, which produce a number of fixed frequency lines at discrete wavelengths. By placing the adjustable wavelength selector 14 within the resonant cavity, only the wavelength selectively passed through the wavelength selector will resonate within the cavity. Thus, the output of the laser will comprise only a narrow band centered about the selected wavelength. As the wavelength selector is adjusted to pass different wavelengths, the output of the laser will change accordingly. The wavelength selector 14 may selectively pass any wavelength within the gain spectrum of the lasing medium 13, including wavelengths at which the lasing medium 13 has little or no gain and therefore little or no output power, such wavelengths defining, for the purposes of this disclosure, the flat region within the output spectrum of the lasing medium 13.

Figure 2:
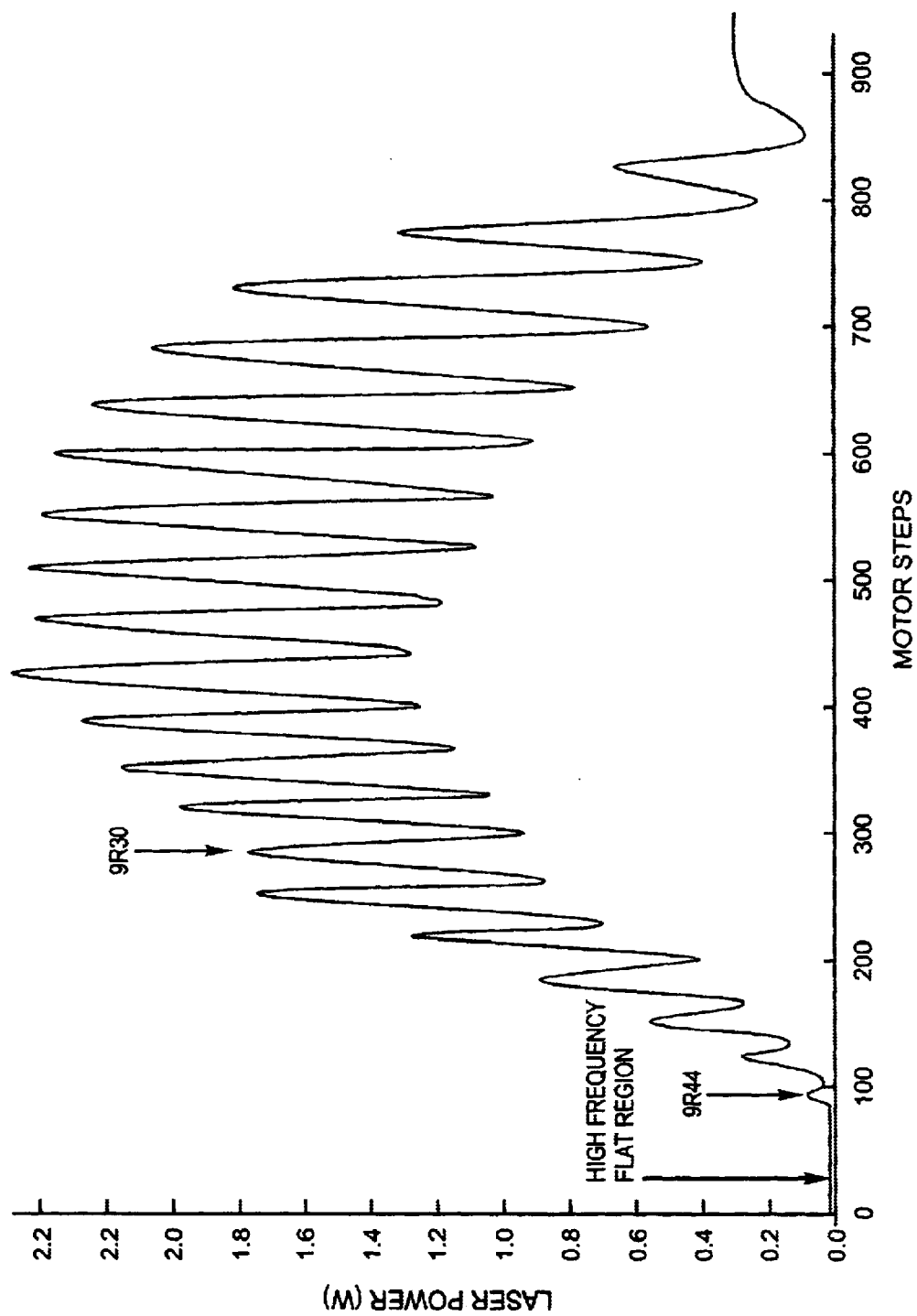
FIG. 2 is a graph showing the spectral lines from the 9R transition of a first $CO_2$ laser.
Figure 3:
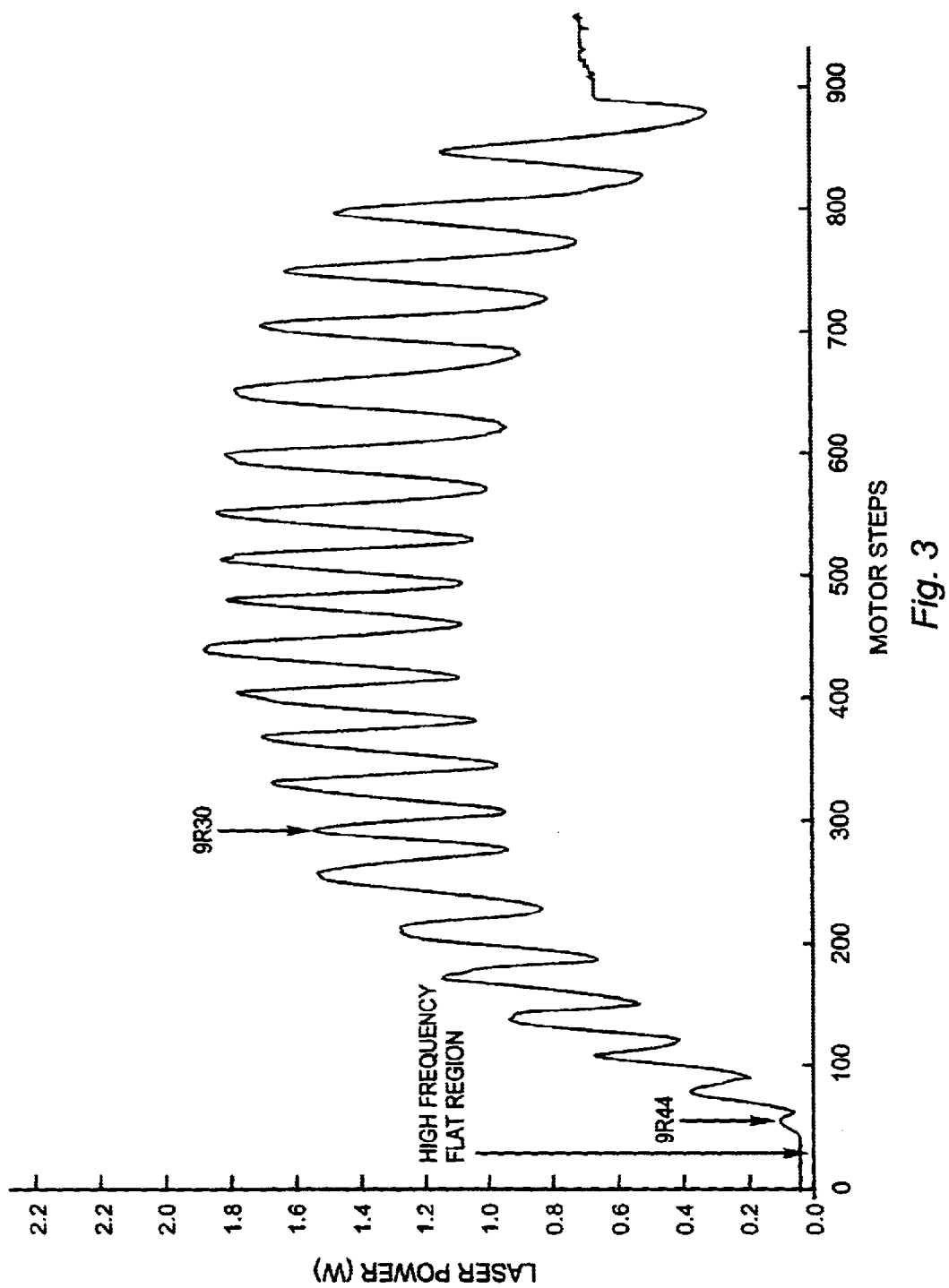
FIG. 3 is a graph showing the spectral lines from the 9R transition of a second $CO_2$ laser.

FIG. 2 shows a graph of laser power versus position of the adjustable wavelength selector for the 9R vibrational-rotational transition band from a first $CO_2$ laser. The profile of this graph exemplifies the output spectrum of lasing media, which may be used in this system. FIG. 3 shows a graph of laser power versus position of the adjustable wavelength selector for the 9R vibrational-rotational transition band from a second $CO_2$ laser that may also be used in this system. Each laser has distinctly different absolute and relative output power characteristics and different line widths (as a function of the tuning steps of adjustment of the wavelength selector) on various laser lines. However, because the present system and method do not rely on absolute output power or line width, the system and method work equally well with both lasers in selecting an output wavelength.

The position of each spectral line within the output spectrum of the lasing medium 13 is most easily identified by its position relative to the flat region. For example, in FIG. 2 the spectral line immediately adjacent the flat region, the 9R44 spectral line, is the first spectral line, while the 9R30 spectral line is the eighth spectral line. Thus, if laser operation and its power output is desired at the wavelength of the 9R30 transition, then the system is instructed to identify the eighth spectral line. The output spectrum of any lasing media may be similarly labeled, thus allowing easy access to wavelengths at or near the peak of any spectral line in a lasing media's spectrum.

The wavelength selector 14 may be of any type known to those skilled in the art, which is adjustable to allow a specific wavelength within a range of wavelengths to pass with minimal loss. All other wavelengths are strongly attenuated in traversing through the wavelength selector 14. In addition, the wavelength selector 14 is preferably operational over the entire range of the output spectrum of the lasing medium 13. In a preferred embodiment, the wavelength selector 14 may comprise a reflective diffraction grating, which replaces one of the end mirrors 19. The wavelength selector 14 preferably includes a stepper motor 22, thereby permitting the wavelength selector 14 to be adjusted through a plurality of discrete steps. The ability of the system to accurately select a desired wavelength is partially dependent upon the range of adjustment of the wavelength selector 14 and the number of steps that range is divided into by the stepper motor 22. Thus, for example, when the 9R vibrational-rotational band of the $CO_2$ laser is being utilized within this system, the wavelength selector 14 is preferably capable of selecting any wavelength within the band and the stepper motor 22 preferably divides the range of adjustments of the wavelength selector 14 into at least 500 steps, and more preferably into at least 1000 steps, and even more preferably into at least 5000 steps. The number of steps, however, may vary for each type of laser used and for each application of the system.

Light output from the laser 12 is directed towards the beam splitter 16. The beam splitter 16 directs a small known percentage of the light towards the detector 18 while allowing the remaining portion of the light to pass through for unrestricted use in any application. The detector 18 measures the power of the light incident upon its face and may be any type of detector known to those skilled in the art which can detect the power of incident light within the spectral range of the laser used in the system 10.

The processor 20 is electronically coupled to the detector 18 and receives power measurement data from the detector 18. The processor 20 is also electronically coupled to the wavelength selector 14 to control adjustments to the wavelength selector 14 through the stepper motor 22. The processor 20 may thus be in the form of an electronic circuit designed to perform the functions as described herein, or a computer having appropriate inputs and outputs for the detector 18 and wavelength selector 14, respectively, and also having appropriate programming to perform the described functions. The processor 20 also preferably includes an appropriate human interface and a memory in which the power measurements and threshold values, described further below, may be stored and retrieved.

Figure 4:
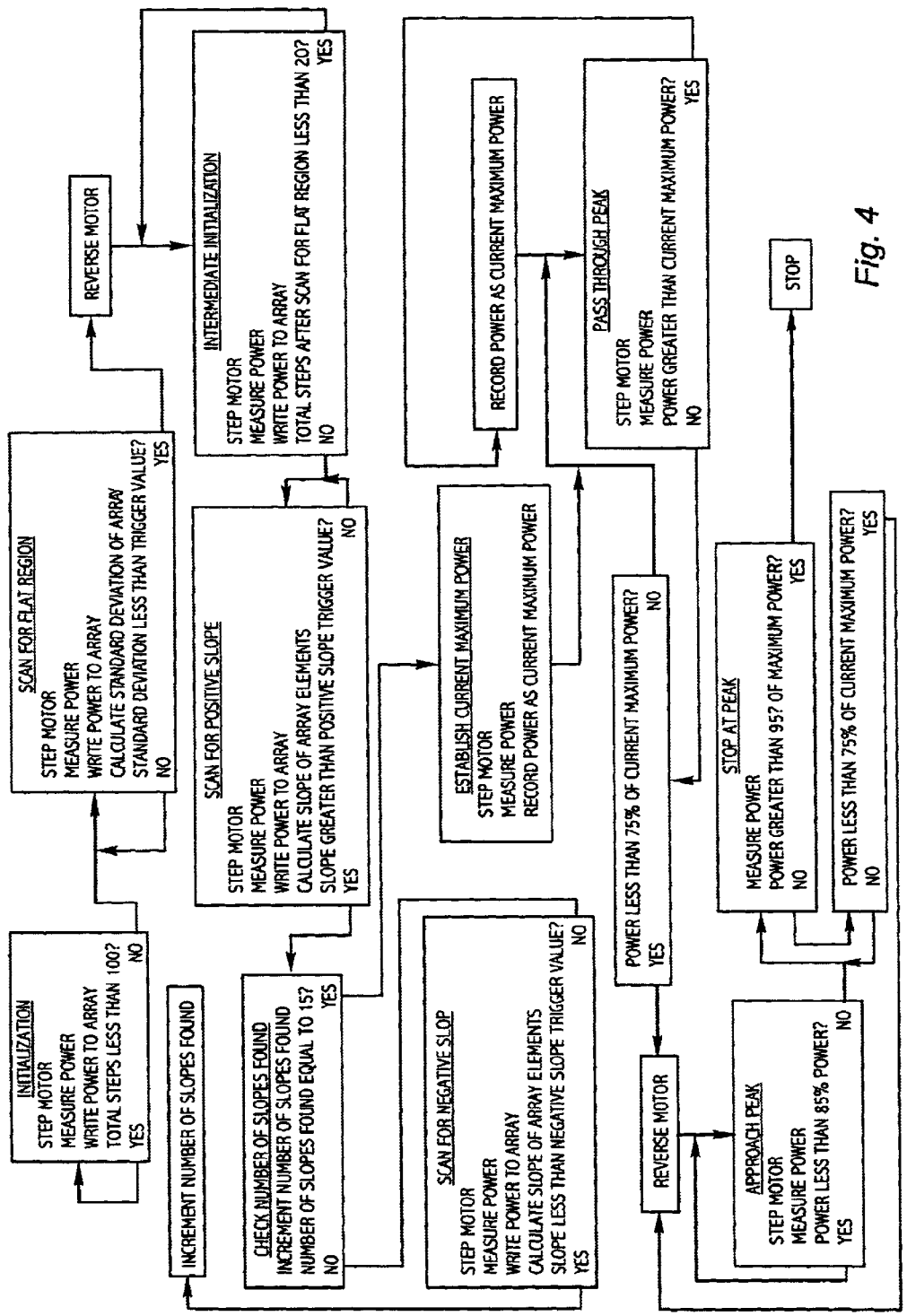
FIG. 4 is a flowchart illustrating the method of the invention in accordance with the preferred embodiment.
Figure 5:
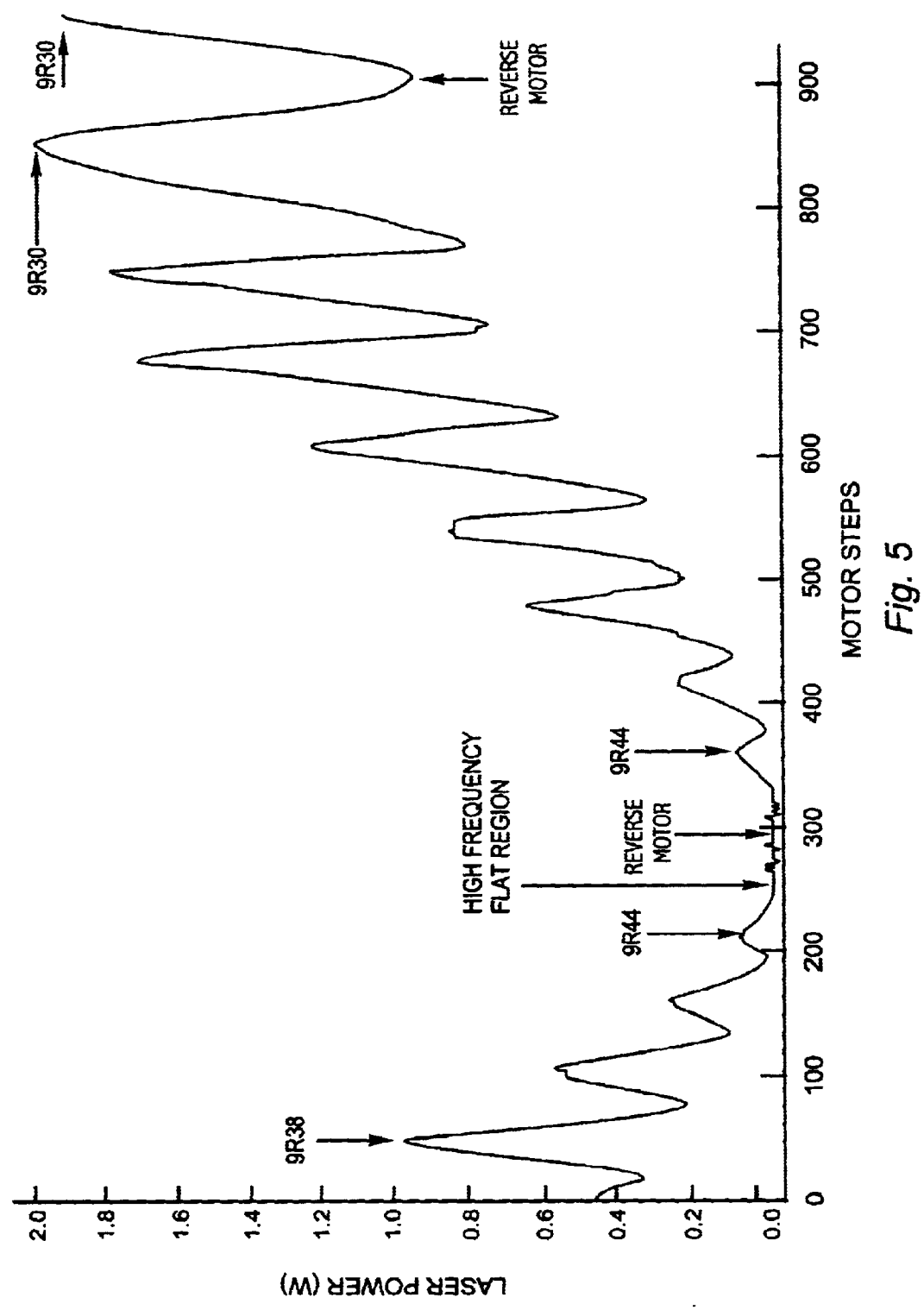
FIG. 5 is a graph showing a sample of the power measurements of a $CO_2$ laser on the 9R transition taken while performing the method of the present invention.

FIG. 4 is a flow chart that illustrates the preferred method of practicing the invention using the above-described system. Once the system is instructed to select an output wavelength of the laser on a desired spectral line, the process proceeds through three distinct phases to select the output wavelength: (1) identify and locate the flat region, (2) identify and locate the desired spectral line, and (3) adjust the wavelength selector to select an output wavelength within the desired spectral line, the output wavelength approximately corresponding to the peak of the desired spectral line. The selected wavelength will resonate within the cavity and become the output wavelength of the laser 12.

The processor begins the first phase of the selection process by adjusting the wavelength selector through a first series of discrete steps. During the first series of steps, the wavelength selector is adjusted towards the flat region in the laser's output spectrum. For a $CO_2$ laser operating in the 9R band, this entails adjusting the wavelength selector to selectively pass wavelengths towards the high frequency end of the laser's output spectrum.

At each step, the power of the light output from the laser is measured and the measurement is added to a first array. The first array is preferably configured to hold a maximum number of power measurements, and after the array contains the maximum number, power measurements are removed from the array on a first in, first out basis. In this manner, the predetermined maximum number of power measurements is maintained in the first array. The maximum number for the first array may be set to any number for which the power measurements will yield statistically meaningful results, however, it may be desirable to consider such factors as the desired speed of completing the process and the overall range of adjustments of the wavelength selector when setting the maximum number. For example, an array limited to 100 elements has been found to work well for identifying the flat region without unduly slowing the process.

Once the first array contains the maximum number of power measurements, a statistical analysis is performed on the array following the addition of each power measurement in order to identify the flat region. In the preferred embodiment, the statistical analysis includes calculating the standard deviation of the power measurements in the first array and comparing each standard deviation to a threshold level. The flat region is identified when the standard deviation drops below the threshold level. For example, in a system including a $CO_2$ laser and having a power measurement noise level corresponding to approximately 20 milliwatts, a threshold level of 40 milliwatts has been found sufficient to identify the flat region over the noise. This threshold level may vary, as it largely depends upon the noise level of the detector when measuring little or no output power from the laser. In general, the threshold should be set low enough to differentiate and identify the flat region over other regions of the spectrum, but not so low as to prevent the flat region from being identified because of noise originating from the power measurement device.

After identifying the flat region, the desired spectral line is chosen by adjusting the wavelength selector through a second series of discrete steps away from the flat region and in the direction of the desired spectral line. Again, the power of the light output from the laser is measured at each discrete step and the corresponding power measurement is added to a second array. The second array is preferably configured to hold a maximum number of power measurements, and after the second array contains the maximum, power measurements are removed from the second array on a first in, first out basis. In this manner, the maximum number of power measurements is maintained in the second array while the desired spectral line is being identified. The maximum number may be set to any number for which the power measurements will yield statistically meaningful results, however, it may be desirable to consider other factors when setting the maximum number, such as the completion speed of the process, the power output of the laser, the width of the spectral lines, and the number of steps effectively contained within the width of the spectral lines. For example, an array limited to 20 elements has been found to work well when identifying the spectral lines of $CO_2$ lasers.

Once the second array contains the maximum number of power measurements, a statistical analysis is performed on the array following the addition of each power measurement. In the preferred embodiment, the statistical analysis includes fitting a line to the second array to determine the slope of the power measurements in the array. The line fit may be performed through any statistical method, including but not limited to the least squares method. In performing this line fit, each power measurement is placed on the y-axis and is associated with a discrete step on the x-axis, wherein the difference between each discrete step on the x-axis is exactly 1, thus simplifying the calculations associated with the line fit.

The slope calculated after each step is initially compared to a positive threshold. When the slope becomes greater than the positive threshold for the first time, the output of the laser is on the uphill portion of the first spectral line. The threshold level may vary, depending upon the noise level included in the power measurement and the power and width of the spectral lines. For example, in a system having a noise level of approximately 1 milliwatt per step, the system including a $CO_2$ laser operating in the 9R band, a threshold level of 3 milliwatts per step has been found sufficient to identify the uphill portion of any spectral line. In general, for any given laser, the threshold should be set high enough so that noise fluctuations are not mistaken for the uphill portion of a spectral line, yet not so high that one of the spectral lines might be missed. However, if a spectral line is missed because noise forces the threshold to be set high, then that spectral line should not be included when the position of each spectral line is enumerated relative to the flat region.

After identifying the uphill portion of the first spectral line, a slope counter is set to one and the wavelength selector continues to progress through the second series of steps, with a power measurement taken at each step. The power measurements continue to be added to the second array and the slope of the array after each addition continues to be calculated in the same manner as before. However, the slopes are now compared to a negative threshold. The same factors used to set the positive threshold are taken into consideration when setting the negative threshold. When the slope falls below the negative threshold, the downhill portion of the spectral line is identified. The slope count is thereafter incremented by one and the process continues to identify the uphill and downhill portions of each spectral line between the flat region and the desired spectral line. When slope count is equal to 2n−1, with n being the number of the desired spectral line relative to the flat region, the uphill portion of the desired spectral line is identified.

Upon identifying the uphill portion of the desired spectral line, the wavelength selector continues to progress through the second series of steps, with a power measurement taken at each step. The first power measurement taken after identifying the desired spectral line is stored as the current maximum power. Each subsequent power measurement is compared to the current maximum power and if the subsequent power measurement is greater than or equal to the current maximum power, the value of the current maximum power is set to the value of the subsequent power measurement. This process continues until a subsequent power measurement drops below a specified power level relative to the current maximum power, a point that indicates that the downhill portion of the desired spectral line has begun. Preferably, the specified power level is 75% of the current maximum power value, however the level may be set according to the requirements of any given laser or system.

After identifying the downhill portion of the desired spectral line, the adjustment direction of the wavelength selector is reversed and the wavelength selector is adjusted in steps towards the flat region. The power of the light output from the laser is measured at each step and each power measurement is compared to an upper value that is set as a percentage, preferably 95%, and more preferably 99%, of the current maximum power value. When the power measurement rises above the upper value, the laser output, as selected by the wavelength selector, is at or near the peak of the desired spectral line and the adjustment process stops. If, however, the power measurement falls below a lower value that is set as a percentage, preferably 85%, of the current maximum power value, the wavelength selector again reverses direction and each power measurement is again compared to the above noted maximum power. This process of reversing the adjustment direction of the wavelength selector may continue until a power measurement above the upper value is identified. It should be apparent to those skilled in the art that the upper and lower values play an important role in selecting an output wavelength of the laser to be at or near the peak of the desired spectral line. These values may vary depending on the characteristics of the laser used, such as the power output and the width of the desired spectral line, and the overall number of steps the spectral range of the laser is divided into by the wavelength selector. Therefore, the upper and lower values should be adjusted accordingly to account for these variable characteristics.

Once the laser output approximately corresponds to the peak of the desired spectral line, the wavelength selector may be easily adjusted to select a laser output approximately corresponding to the peak of any other spectral line without having to re-identify the flat region. This is done by identifying the relative position of the new spectral line compared to the current spectral line, adjusting the wavelength selector through a series of discrete steps, and identifying each spectral line by counting the uphill and downhill portions of the slopes until the new spectral line is identified.

The following is a detailed example of an algorithm that may be used to select an output wavelength of a laser. In the example, the desired spectral line is the eighth spectral line.

1. Initialization
   a. Step motor.
   b. Measure laser power.
   c. Write laser power to a first array.
   d. If total motor steps is less than 100, repeat step 1, else go to step 2.
2. Scan for flat region
   a. Step motor.
   b. Measure laser power.
   c. Write laser power to the first array on a first in, first out basis, maintaining the array at 100 elements.
   d. Calculate the standard deviation of the power measurements stored in the first array.
   e. If the calculated standard deviation is less than the threshold value, reverse the motor and go to step 3, else repeat step 2.
3. Intermediate initialization
   a. Step motor.
   b. Measure laser power.
   c. Write laser power to a second array.
   d. If the number of total motor steps since the end of step 2 is less than 20, repeat step 3, else go to step 4.
4. Scan for positive slope
   a. Step motor.
   b. Measure laser power.
   c. Write laser power to the second array on a first in, first out basis, maintaining the array at 20 elements.
   d. Calculate the slope of the power measurements stored in the second array. If the slope is less than a positive threshold, repeat step 4. If the slope is greater than the positive threshold, increment the slope count. If the number of the slope count equals 15, go to step 6, else go to step 5.
5. Scan for negative slope
   a. Step motor.
   b. Measure laser power.
   c. Write laser power to the second array on a first in, first out basis, maintaining the array at 20 elements.
   d. Calculate the slope of the power measurements stored in the second array. If the slope is less than a negative threshold, increment the slope count and go to step 4, else repeat step 5.
6. Establish current maximum power
   a. Step motor.
   b. Measure laser power.
   c. Set power measurement as current maximum power and go to step 7.
7. Pass through peak
   a. Step motor.
   b. Measure laser power.
   c. If the power measurement is greater than or equal to the current maximum power, store the power measurement as the current maximum power and repeat step 7.
   d. If the power measurement is less than 75% of the current maximum power, reverse the motor and go to step 8.
8. Approach peak
   a. Step motor.
   b. Measure laser power.
   c. If the power measurement is less than 85% of the current maximum power, repeat step 8, else go to step 9.
9. Stop at peak
   a. Step motor.
   b. Measure laser power.
   c. If the power measurement is greater than 95% of the current maximum power, stop process, else if the power measurement is less than 75% of the current maximum power, reverse the motor and go to step 8, else repeat step 9.

Thus, a system and method for selecting an output wavelength of a laser are disclosed. While embodiments of this invention have been shown and described, it would be apparent to those skilled in the art that many more modifications are possible without departing from the inventive concepts herein. The invention, therefore, is not to be restricted except in the spirit of the following claims.

What is claimed is:

1. A laser wavelength selection system comprising:
   a laser including a lasing medium having an output spectrum characterized b) a plurality of discrete spectral lines;
   an adjustable wavelength selector disposed within and optically coupled to an optical cavity of the laser;
   a detector means optically coupled to the laser, for calculating the power of light output by the laser; and
   a processor means, electronically coupled to the detector and to the wavelength selector, for adjusting the wavelength selector through a series of discrete steps, means for receiving at least one power measurement from the detector means at each of the discrete steps, means for performing statistical analyses on the power measurements, and, based on the statistical analyses, and means for adjusting the wavelength selector to selectively pass light having a wavelength which approximately corresponds to a peak of one of the spectral lines.

2. The system of claim 1, wherein the statistical analyses the processor means places each power measurement on the y-axis and a discrete step on the x-axis to perform standard deviation analyses of the successive power measurements.

3. The system of claim 1, wherein the statistical analyses the processor means is further defined as for performing curve fit analyses of the successive power measurements.

4. A laser wavelength selection system comprising:
   a laser including a lasing medium having an output spectrum characterized by a plurality of discrete spectral lines and a distinct flat region;
   an adjustable wavelength selector disposed within and optically coupled to an optical cavity of the laser;
   a detector means optically coupled to the laser, for calculating the power of light output by the laser; and
   a processor means electronically coupled to the detector and to the wavelength selector, and (i) means for adjusting the wavelength selector though a first series of discrete steps, (ii) means for receiving at least one power measurement from the detector means at each of the discrete steps of the first series of discrete steps, thereby receiving a first series of successive power measurements, (iii) means for performing standard deviation analyses on the first series of successive power measurements, (iv) means for adjusting the wavelength selector to selectively pass light within the flat region based on the standard deviation analyses, (v) means for adjusting the wavelength selector through a second series of discrete steps, (vi) means for receiving at least one power measurement from the detector means at each of the discrete steps of the second series of discrete steps, thereby receiving a second series of successive power measurements, (vii) means for performing curve fit analyses on the second series of successive power measurements, (viii) means for identifying a peak of one of the spectral lines based on the curve fit analyses, and (ix) means for adjusting the wavelength selector to selectively pass light having a wavelength which approximately corresponds to the peak.

5. A method of selecting an output wavelength of a laser having an optical cavity, a lasing medium having an output spectrum characterized by a plurality of discrete spectral lines and a distinct flat region, and an adjustable wavelength selector within the optical cavity, the method comprising:
   adjusting the wavelength selector through a first series of discrete steps;
   taking a first series of power measurements of light output from the laser as the wavelength selector is adjusted through the first series of discrete steps;
   identifying the flat region through first statistical analyses of the first series of power measurements;
   adjusting the wavelength selector through a second series of discrete steps;
   taking a second series of power measurements of light output from the laser as the wavelength selector is adjusted through the second series of discrete steps;
   identifying a spectral line corresponding to a desired output wavelength through second statistical analyses of the second series of power measurements; and
   adjusting the wavelength selector to select the output wavelength.

6. The method of claim 5, wherein taking the first series of power measurements of the light output from the laser includes taking at least one power measurement at each step of the first series of discrete steps.

7. The method of claim 5, wherein identifying the flat region comprises the steps of
   storing each power measurement of the first series of power measurements to an array configured to store a maximum number of power measurements;
   calculating a standard deviation from the first series of power measurements stored to the array after storing each power measurement to the array once the array contains the maximum number of power measurements; and
   identifying the flat region by comparing each calculated standard deviation to a threshold.

8. The method of claim 7, wherein the step of storing each power measurement of the first series of power measurements to the array includes removing a stored power measurement from the array on a first in, first out basis once the array contains the maximum number of power measurements.

9. The method of claim 5, wherein taking the second series of power measurements of the light output from the laser includes taking at least one power measurement at each step of the second series of discrete steps.

10. The method of claim 5, wherein identifying the spectral line comprises the steps of
    storing each power measurement of the second series of power measurements to an array configured to store a maximum number of power measurements;
    calculating a slope from the second series of power measurements stored to the array after storing each power measurement to the array once the array contains the maximum number of power measurements; and
    comparing each calculated slope to a threshold and identifying each spectral line based on the number of times the calculated slope crosses the threshold until the spectral line corresponding to the desired output wavelength is identified.

11. The method of claim 10, wherein the step of storing each power measurement of the second series of power measurements to the array includes removing a stored power measurement from the array on a first in, first out basis once the array contains the maximum number of power measurements.

12. A method of selecting an output wavelength of a laser having an optical cavity, a lasing medium having an output spectrum characterized by a plurality of discrete spectral lines and a distinct flat region, and an adjustable wavelength selector within the optical cavity, the method comprising:

adjusting the wavelength selector through a first series of discrete steps;

taking a first series of power measurements of light output from the laser as the wavelength selector is adjusted through the first series of discrete steps;

storing each power measurement of the first series of power measurements to a first array configured to store a first maximum number of power measurements;

identifying the flat region through first statistical analyses of the first series of power measurements stored to the first array;

adjusting the wavelength selector through a second series of discrete steps;

taking a second series of power measurements of light output from the laser as the wavelength selector is adjusted through the second series of discrete steps;

storing each power measurement of the second series of power measurements to a second array configured to store a second maximum number of power measurements;

identifying a spectral line corresponding to a desired output wavelength through second statistical analyses of the second series of power measurements stored to the second array; and adjusting the wavelength selector to select the output wavelength.

13. The method of claim 12, wherein the step of storing each power measurement of the first series of power measurements to the first array includes removing a stored power measurement from the first array on a first in, first out basis once the first array contains the first maximum number of power measurements.

14. The method of claim 12, wherein identifying the flat region comprises the steps of calculating a standard deviation of the first series of power measurements stored to the first array after storing each power measurement of the first series of power measurements to the first array once the first array contains the maximum number of power measurements; and identifying the flat region by comparing each calculated standard deviation to a threshold.

15. The method of claim 12, wherein the step of storing each power measurement of the second series of power measurements to the second array includes removing a stored power measurement from the second array on a first in, first out basis once the second array contains the second maximum number of power measurements.

16. The method of claim 12, wherein identifying the desired spectral line comprises the steps of calculating a slope from the second series of power measurements stored to the second array after storing each power measurement of the second series of power measurements to the second array once the second array contains the second maximum number of power measurements; and comparing each calculated slope to a threshold and identifying each spectral line based on the number of times the calculated slope crosses the threshold until the spectral line corresponding to the desired output wavelength is identified.

* * * * *